United States Patent
Lu et al.

(10) Patent No.: US 11,289,905 B2
(45) Date of Patent: Mar. 29, 2022

(54) VOLTAGE AND CURRENT CONTROL METHOD AND DEVICE FOR DIRECT-CURRENT POWER TRANSMISSION SYSTEM

(71) Applicants: NR ELECTRIC CO., LTD., Jiangsu (CN); NR ENGINEERING CO., LTD., Jiangsu (CN)

(72) Inventors: Jiang Lu, Jiangsu (CN); Yu Lu, Jiangsu (CN); Yunlong Dong, Jiangsu (CN); Yongping Wang, Jiangsu (CN); Jie Tian, Jiangsu (CN); Nannan Wang, Jiangsu (CN); Wenqiang Zhao, Jiangsu (CN); Zhaoqing Hu, Jiangsu (CN); Ke Wang, Jiangsu (CN); Jianmin Xiao, Jiangsu (CN)

(73) Assignees: NR ELECTRIC CO., LTD., Jiangsu (CN); NR ENGINEERING CO., LTD., Jiangsu (CN)

( * ) Notice: Subject to any disclaimer, the term of this patent is extended or adjusted under 35 U.S.C. 154(b) by 69 days.

(21) Appl. No.: 16/767,922

(22) PCT Filed: Nov. 28, 2018

(86) PCT No.: PCT/CN2018/117937
§ 371 (c)(1),
(2) Date: May 28, 2020

(87) PCT Pub. No.: WO2019/109841
PCT Pub. Date: Jun. 13, 2019

(65) Prior Publication Data
US 2020/0295563 A1    Sep. 17, 2020

(30) Foreign Application Priority Data
Dec. 7, 2017 (CN) .......................... 201711281787.3

(51) Int. Cl.
*G06F 1/00* (2006.01)
*H02J 1/08* (2006.01)

(52) U.S. Cl.
CPC .................................. *H02J 1/082* (2020.01)

(58) Field of Classification Search
CPC ...... H02J 1/082; H02J 1/00; H02J 3/36; H02J 2003/365; Y02E 60/60
(Continued)

(56) References Cited

U.S. PATENT DOCUMENTS

| 10,014,686 B2 * | 7/2018 | Lu .............................. H02J 3/02 |
| 10,411,616 B2 * | 9/2019 | Adamczyk ................ H02J 3/36 |
| 2015/0155716 A1 | 6/2015 | Baida et al. |

FOREIGN PATENT DOCUMENTS

| CN | 102223090 A | 10/2011 |
| CN | 105762824 A | 7/2016 |

(Continued)

OTHER PUBLICATIONS

WIPO, State Intellectual Property Office of the P.R. China International Search Authority, International Search Report (with English translation) and Written Opinion dated Jan. 31, 2019 in International Patent Application No. PCT/CN2018/117937, 10 pages.

*Primary Examiner* — Richard Tan
(74) *Attorney, Agent, or Firm* — Masuvalley & Partners

(57) ABSTRACT

Disclosed in the present invention is a voltage and current control method for a direct-current transmission system. The method comprises: calculating a DC voltage reference value of a voltage source converter of a DC voltage control end, on the basis whether a direct-current voltage end of a direct-current pole of a direct-current transmission system substantially controls a direct-current voltage; using ½ of the calculated direct-current voltage reference value of the voltage source converter as a bridge arm voltage direct-current bias, calculating a difference between the direct-
(Continued)

current voltage reference value of the voltage source converter and a measured direct-current voltage value, and inputting the difference into a direct-current voltage control outer loop of the voltage source converter to perform closed-loop control, so as to control the direct-current voltage or the direct current of the direct-current pole. Correspondingly, also provided is a voltage and current control device for the direct-current transmission system. By the means of the present invention, the direct-current voltage and the direct current of the direct-current transmission system provided with the voltage source converter can be effectively controlled.

10 Claims, 4 Drawing Sheets

(58) Field of Classification Search
 USPC .......................................................... 713/300
 See application file for complete search history.

(56) References Cited

FOREIGN PATENT DOCUMENTS

| | | |
|---|---|---|
| CN | 105790249 A | 7/2016 |
| CN | 106505641 A | 3/2017 |
| CN | 107769241 A | 3/2018 |

\* cited by examiner

VOLTAGE AND CURRENT CONTROL METHOD AND DEVICE FOR DIRECT-CURRENT POWER TRANSMISSION SYSTEM

RELATED APPLICATIONS

This application is the U.S. National Phase of and claims priority to International Patent Application No. PCT/CN2018/117937, International Filing Date Nov. 28, 2018, entitled Voltage And Current Control Method And Device For Direct-Current Power Transmission System; which claims benefit of Chinese Application No. 201711281787.3 filed Dec. 7, 2017; both of which are incorporated herein by reference in their entireties.

TECHNICAL FIELD

The present invention belongs to the technical field of direct-current (DC) transmission, and particularly relates to a voltage and current control method for a DC transmission system, and a voltage current control device for a DC transmission system.

BACKGROUND

High Voltage Direct-Current (HVDC) transmission systems can be divided into two types: conventional direct-current transmission systems based on thyristor converter valves (LCC-HVDC) and flexible direct-current transmission systems based on fully controlled voltage source converters (VSC-HVDC). The conventional DC transmission system has low cost, low loss and mature operation technology. Most of the DC transmission systems currently in operation in the world are LCC-HVDC systems, but the conventional DC transmission system has many disadvantages, such as the converter side is prone to commutation failure, the strong dependence on the AC system, the need to adopt a lot of reactive power, and the large area for converter station. A new generation flexible DC transmission system has the advantages of decoupled control for active power and reactive power, the ability to supply power to passive network, compact structure, small space occupation, no commutation failure, etc., but it also has the disadvantages of high cost. Therefore, combining the advantages of both conventional DC transmission and flexible DC transmission, a hybrid DC transmission technology using a thyristor converter valve at one end of the converter station and a voltage source converter valve at the other end of the converter station has a good engineering application prospect. Over the long term, with the reduction of the price of the fully controlled device used in the voltage source converter valve, the flexible DC transmission technology using the voltage source converter valve at both ends of the converter station will also be more and more widely used.

For the DC transmission system, in normal operation state, a control method of controlling the DC current by using a rectifier station and controlling the DC voltage by using an inverter station is generally adopted. Generally, the objective of DC voltage control is to control the DC voltage at the outlet of the rectifier station to reach the DC voltage reference value of the rectifier station set by the operator. Due to the existence of DC line resistance, the line voltage drop will increase with the increase of DC current. Therefore, the inverter station needs to adjust the DC voltage output with the DC current changes to ensure that the DC voltage of the rectifier station is maintained at the set reference value level. In addition, when the fault of the AC system of the transmitting end where the rectifier station is located causes the AC voltage to drop significantly, the rectifier station will lose the control ability for the DC current. In such case, it is necessary for the inverter station to maintain the control of DC current by controlling the DC voltage reduction.

In the existing VSC-HVDC control technology, the DC voltage outputted by the voltage source converter cannot be directly controlled according to the DC voltage reference value, and can only be indirectly controlled by changing the capacitance voltage or the sub-module capacitance voltage of the voltage source converter, and the DC voltage cannot be largely reduced. Therefore, it is necessary to find a method for effectively controlling the DC voltage and DC current of the DC transmission system having voltage source converters.

SUMMARY OF THE INVENTION

To response to the deficiencies of the prior art, an object of the present invention is to provide a method and a device for controlling the voltage and current of a direct-current transmission system to meet the operational requirements for the direct-current transmission system including voltage source converters.

In order to achieve the above object, the technical solution adopted by the present invention is to provide a voltage and current control method for DC transmission system, the DC transmission system comprising at least one DC pole, the DC pole having a DC current control end and a DC voltage control end, and the DC voltage control end of the DC pole comprising at least one voltage source converter, the control method comprising:

obtaining a DC voltage reference value $U_{dcref}$ required for controlling the DC voltage of the DC voltage control end according to a DC voltage control target of the DC pole, and obtaining a DC voltage measurement value $U_{dV}$ of the voltage source converter of the DC voltage control end;

obtaining a DC current reference value $I_{dcref}$ and a DC current measurement value $I_{dc}$ of the DC voltage control end of the DC pole;

using the DC voltage reference value $U_{dcref}$ required for controlling the DC voltage as the DC voltage reference value $U_{dVref}$ of the voltage source converter if the DC voltage control end of the DC pole substantially controls the DC voltage;

calculating a difference between the DC current measurement value $I_{dc}$ with the DC current reference value $I_{dcref}$ if the DC voltage control end of the DC pole substantially controls the DC current, and then inputting the difference into the DC current controller of the voltage source converter to perform closed-loop control, and using the output of the DC current controller as the DC voltage reference value $U_{dVref}$ of the voltage source converter;

using ½ of the DC voltage reference value $U_{dVref}$ of the voltage source converter as a DC bias of the bridge arm voltage of the voltage source converter, and calculating a difference between the DC voltage reference value $U_{dVref}$ of the voltage source converter with the DC voltage measurement value $U_{dv}$, then inputting the difference into the DC voltage control outer loop of the voltage source converter to perform closed-loop control and realize the control of DC voltage or DC current of the DC pole.

The DC voltage reference value required for controlling the DC voltage of the DC voltage control end of the DC pole is used as the upper limit of the output of the DC current controller of the voltage source converter.

The method for obtaining the DC current reference value of the DC voltage control end of the DC pole comprises: subtracting a current deviation from the DC current reference value of the DC current control end of the DC pole as the DC current reference value of the DC voltage control end.

When the DC voltage control end of the DC pole contains two or more voltage source converters operating in series, one of the voltage source converters is selected as the master control converter, and the other converters are the slave control converters, the DC voltage reference values of each slave control converter are synchronously consistent with the DC voltage reference value of the master control converter.

When the DC voltage control end of the DC pole contains two or more voltage source converters operating in series, if the DC voltage control end of the DC pole substantially controls DC voltage, the DC voltage reference value $U_{dcref}$ required for controlling the DC voltage is distributed according to the total number N of voltage source converters in series operation and used as the DC voltage reference value $U_{dVref}$ of each voltage source converter in operation, where $$U_{dVref} = \frac{U_{dcref}}{N},$$

N is a positive integer.

The present invention also provides a voltage and current control device for DC transmission system, the DC transmission system comprising at least one DC pole, the DC pole comprising a DC current control end and a DC voltage control end, the DC voltage control end of the DC pole comprising at least one voltage source converter, the control device comprising an acquisition unit, a DC voltage reference value calculation unit and a DC voltage control unit, wherein:

the acquisition unit configured for obtaining a DC voltage reference value $U_{dcref}$ required for controlling the DC voltage of the DC voltage control end of the DC pole according to a DC voltage control target of the DC pole, a DC voltage measurement value $U_{dv}$ of the voltage source converter of the DC voltage control end, a DC current reference value $I_{dcref}$ and a DC current measurement value $I_{dc}$ of the DC voltage control end;

the DC voltage reference value calculation unit configured for calculating the DC voltage reference value $U_{dVref}$ of the voltage source converter at the DC voltage control end of the DC pole; if the DC voltage control end of the DC pole substantially controls the DC voltage, using the DC voltage reference value $U_{dcref}$ required for controlling the DC voltage as the DC voltage reference value $U_{dVref}$ of the voltage source converter; if the DC voltage control end of the DC pole substantially controls the DC current, calculating a difference between the DC current measurement value $I_{dc}$ with the DC current reference value $I_{dcref}$, and then inputting the difference into the DC current controller of the voltage source converter to perform closed-loop control, and using the output of the DC current controller as the DC voltage reference value $U_{dVref}$ of the voltage source converter;

the DC voltage control unit configured for using ½ of the DC voltage reference value $U_{dVref}$ of the voltage source converter as a DC bias of the bridge arm voltage of the voltage source converter, and calculating a difference between the DC voltage reference value $U_{dVref}$ of the voltage source converter with the DC voltage measurement value $U_{dv}$, then inputting the difference into the DC voltage control outer loop of the voltage source converter to perform closed-loop control and realize the control of DC voltage or DC current of the DC pole.

The DC voltage reference value calculation unit further comprises an upper limit setting subunit of DC current controller configured for using the DC voltage reference value required for controlling the DC voltage of the DC voltage control end of the DC pole as the upper limit of the output of the DC current controller of the voltage source converter.

The method for obtaining the DC current reference value of the DC voltage control end of the DC pole by the acquisition unit comprising: subtracting a current deviation from the DC current reference value of the DC current control end of the DC pole as the DC current reference value of the DC voltage control end.

In the DC voltage reference value calculation unit, when the DC voltage control end of the DC pole contains two or more voltage source converters operating in series, one of the voltage source converters is selected as the master control converter, and the other converters are the slave control converters, the DC voltage reference values of each slave control converter are synchronously consistent with the DC voltage reference value of the master control converter.

In the DC voltage reference value calculation unit, when the DC voltage control end of the DC pole contains two or more voltage source converters operating in series, if the DC voltage control end of the DC pole substantially controls DC voltage, the DC voltage reference value $U_{dcref}$ required for controlling the DC voltage is distributed according to the total number n of voltage source converters in series operation and used as the DC voltage reference value $U_{dVref}$ of each voltage source converter in operation, where $$U_{dVref} = \frac{U_{dcref}}{N},$$

N is a positive integer.

The beneficial effects of the present invention are described as below:

The present invention provides a voltage and current control method and device for a direct-current transmission system. By adopting the proposed control strategy for the voltage source converters at the DC voltage control end of the DC pole, the DC voltage and DC current of the DC transmission system with voltage source converters can be effectively controlled.

DESCRIPTION OF EMBODIMENTS

The technical solutions of the present invention will be described in detail below with reference to the accompanying drawings and specific embodiments.

The present invention provides a voltage and current control method for a direct-current transmission system, and a voltage and current control device for a direct-current transmission system, which is used for realizing effective control for the direct-current voltage and direct current of the DC transmission system including voltage source converters, and meeting the operation requirements for the DC transmission system including voltage source converters.

Figure 1:
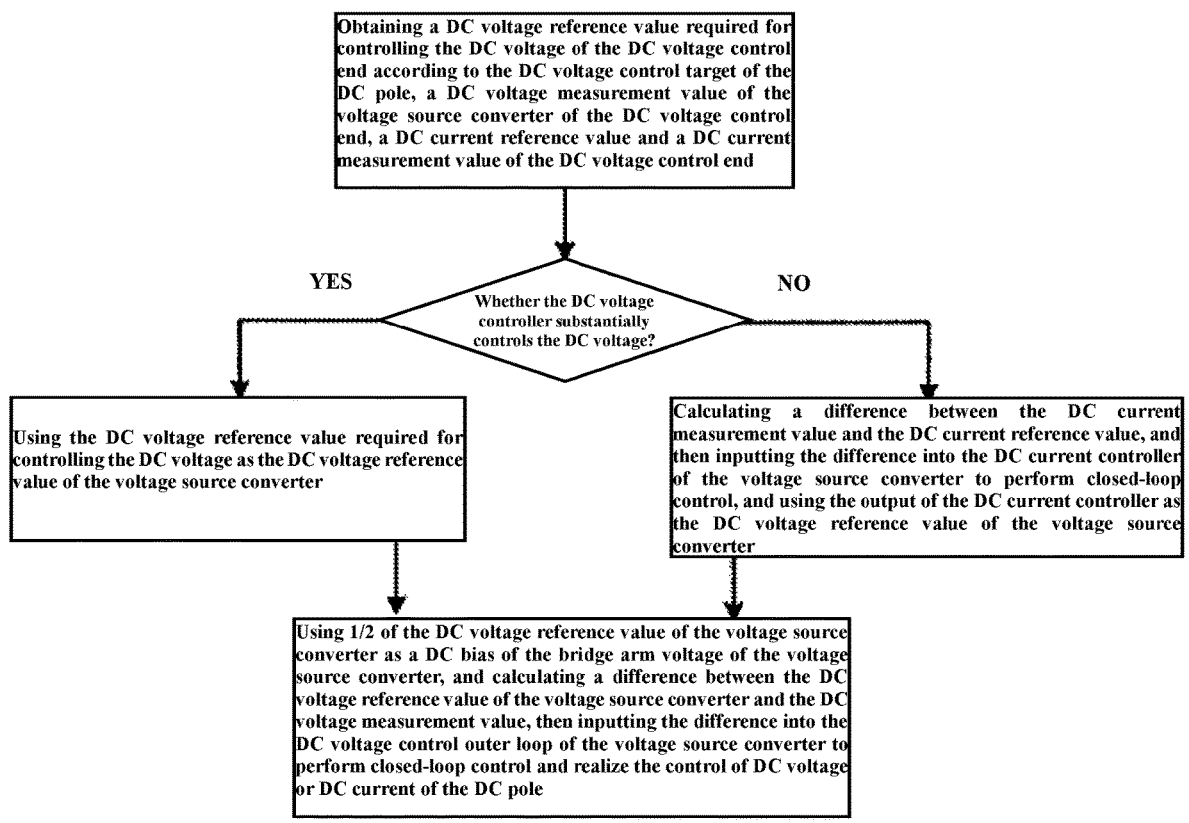
FIG. 1 is a flow chart of a method for controlling voltage and current of a direct-current transmission system provided by the present invention.

In order to achieve the above object, the solution of the present invention is to provide a voltage and current control method for DC transmission system, the DC transmission system includes at least one DC pole, and the DC pole includes a DC current control end and a DC voltage control end, The DC voltage control end of the DC pole includes at least one voltage source converter, and the control method is described below, as shown in FIG. 1:

A DC voltage reference value $U_{dcref}$ required for controlling the DC voltage of the DC voltage control end is obtained according to a DC voltage control target of the DC pole, and a DC voltage measurement value $U_{dV}$ of the voltage source converter of the DC voltage control end is obtained.

The DC voltage control target of the DC pole is generally the DC voltage reference value of the rectifier station set by the operator. For the DC voltage control end in the inverter station, the DC voltage reference value $U_{dcref}$ required for controlling the DC voltage is equal to the value by subtracting the voltage drop of the DC line from the DC voltage reference value of the rectifier station set by the operator.

A DC current reference value $I_{dcref}$ and a DC current measurement value $I_{dc}$ of the DC voltage control end of the DC pole are obtained.

The DC voltage control end of the DC pole is responsible for controlling the DC voltage under normal operating conditions; however, when the fault of the AC system of the transmitting end where the rectifier station is located causes a large drop in the AC voltage, the rectifier station will lose control ability for the DC current. In such case, it is necessary for the inverter station to maintain the control of DC current by controlling the DC voltage reduction.

The DC voltage reference value $U_{dcref}$ required for controlling the DC voltage is used as the DC voltage reference value $U_{dVref}$ of the voltage source converter if the DC voltage control end of the DC pole substantially controls the DC voltage.

If the DC voltage control end of the DC pole substantially controls the DC current, a difference by comparing the DC current measurement value $I_{dc}$ with the DC current reference value $I_{dcref}$ is obtained, and then the difference is inputted into the DC current controller of the voltage source converter to perform closed-loop control, and the output of the DC current controller is used as the DC voltage reference value $U_{dVref}$ of the voltage source converter.

For voltage source converter, its operating characteristics are as shown in equation (1):

$$\begin{cases} u_{pj} = \frac{1}{2}U_{dV} - u_{vjref} \\ u_{nj} = \frac{1}{2}U_{dV} + u_{vjref} \end{cases} \quad (1)$$

wherein, $u_{pj}$ and $u_{nj}$ are the upper bridge arm voltage and lower bridge arm voltage of the voltage source converter j (j=a, b, c) phase, $\frac{1}{2}U_{dV}$ is the bridge arm voltage DC bias, $u_{vjref}$ is the AC voltage reference wave of j phase.

Figure 2:
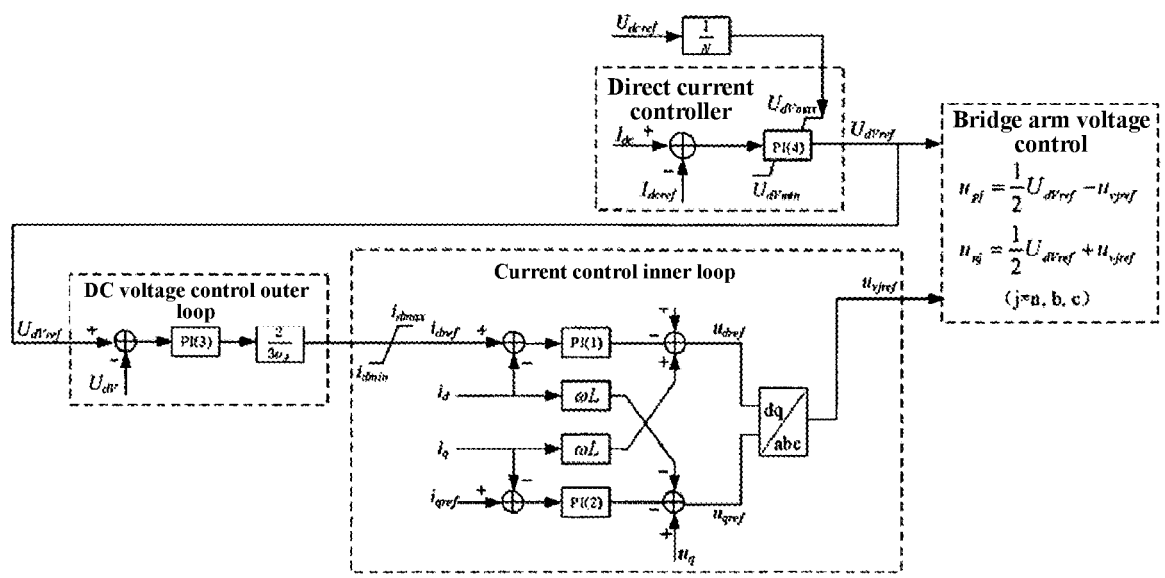
FIG. 2 is a schematic diagram showing the principle of a control strategy for voltage source converters at DC voltage control end of a DC pole according to the present invention.

The control of the voltage source converter is realized by controlling the voltage of the upper and lower bridge arms of each phase. As can be seen from equation (1), the bridge arm voltage includes two parts: the DC bias and the AC voltage reference wave. For the voltage source converter of DC voltage control end of the DC pole, a control strategy shown in FIG. 2 is used:

½ of the DC voltage reference value $U_{dVref}$ of the voltage source converter is used as a DC bias of the bridge arm voltage of the voltage source converter, and a difference is obtained by comparing the DC voltage reference value $U_{dVref}$ of the voltage source converter with the DC voltage measurement value $U_{dV}$, then the difference is inputted into the DC voltage control outer loop of the voltage source converter. The output of the DC voltage control outer loop is limited on current value and amplitude by the inner loop to generate the reference value $i_{dref}$ of d-axis current inner loop, and the reference value is inputted into the current control inner loop of the voltage source converter, the current control inner loop outputs the AC voltage reference wave of voltage source converter; the DC bias of bridge arm voltage and AC voltage reference wave of voltage source converter are used to control the bridge arm voltage, which can realize the control for DC voltage or DC current of DC pole.

In order to realize the automatic and smooth switching of the DC voltage reference value between the situation of substantially controlling DC voltage and the situation of substantially controlling DC current at the DC voltage control end of DC pole, the DC voltage reference value required for controlling the DC voltage of the DC voltage control end of the DC pole is used as the upper limit for the output of DC current controller of the voltage source converter.

The method for obtaining the DC current reference value of the DC voltage control end of the DC pole comprises: subtracting a current deviation from the DC current reference value of the DC current control end of the DC pole as the DC current reference value of the DC voltage control end.

Figure 3:
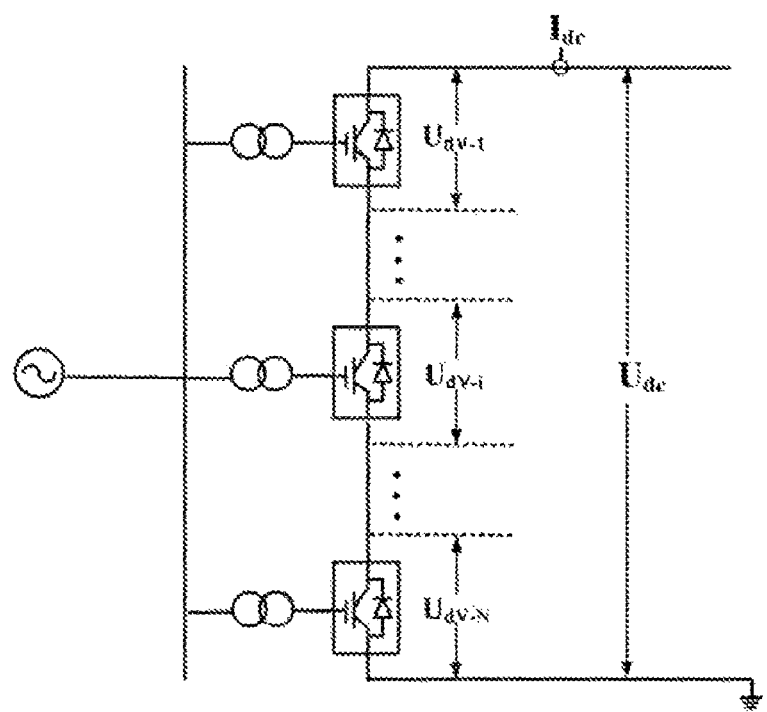
FIG. 3 is a schematic diagram of a topology for two or more voltage source converters operating in series according to the present invention.

When the DC voltage control end of the DC pole contains two or more voltage source converters operating in series, as shown in FIG. 3, in order to realize the operation equalization of each voltage source converter in series, one of the voltage source converters is selected as the master control converter, and the other converters are the slave control converters, the DC voltage reference values of each slave control converter are synchronously consistent with the DC voltage reference value of the master control converter; in addition, if the DC voltage control end of the DC pole substantially controls DC voltage, the DC voltage reference value $U_{dcref}$ required for controlling the DC voltage is distributed according to the total number N of voltage source converters in series operation and used as the DC voltage reference value $U_{dVref}$ of each voltage source converter in operation, where $$U_{dVref} = \frac{U_{dcref}}{N},$$

N is a positive integer.

Figure 4:
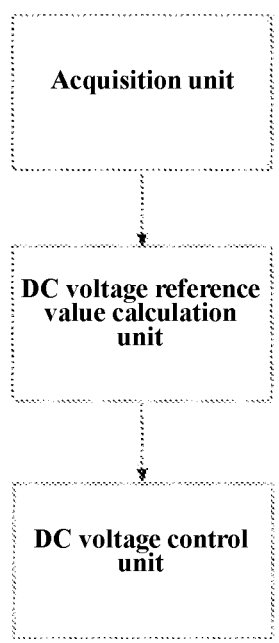
FIG. 4 is a structural block diagram of a voltage and current control device for a direct-current transmission system provided by the present invention.

The present invention also provides a voltage and current control device for a direct-current transmission system, as shown in FIG. 4, which comprises an acquisition unit, a DC voltage reference value calculation unit, and a DC voltage control unit, wherein:

The acquisition unit is configured for obtaining a DC voltage reference value $U_{dcref}$ required for controlling the DC voltage of the DC voltage control end of the DC pole according to a DC voltage control target of the DC pole, a DC voltage measurement value $U_{dv}$ of the voltage source converter of the DC voltage control end, a DC current reference value $I_{dcref}$ and a DC current measurement value $I_{dc}$ of the DC voltage control end.

The DC voltage reference value calculation unit is configured for calculating the DC voltage reference value $U_{dVref}$ of the voltage source converter at the DC voltage control end of the DC pole; if the DC voltage control end of the DC pole substantially controls the DC voltage, using the DC voltage reference value $U_{dcref}$ required for controlling the DC voltage as the DC voltage reference value $U_{dVref}$ of the voltage source converter; if the DC voltage control end of the DC pole substantially controls the DC current, calculating a difference between the DC current measurement value $I_{dc}$ with the DC current reference value $I_{dcref}$, and then inputting the difference into the DC current controller of the voltage source converter to perform closed-loop control, and using the output of the DC current controller as the DC voltage reference value $U_{dVref}$ of the voltage source converter;

The DC voltage control unit is configured for using ½ of the DC voltage reference value $U_{dVref}$ of the voltage source converter as a DC bias of the bridge arm voltage of the voltage source converter, and calculating a difference between the DC voltage reference value $U_{dVref}$ of the voltage source converter with the DC voltage measurement value $U_{dV}$, then inputting the difference into the DC voltage control outer loop of the voltage source converter to perform closed-loop control and realize the control of DC voltage or DC current of the DC pole.

The DC voltage reference value calculation unit further comprises an upper limit setting subunit of DC current controller configured for using the DC voltage reference value required for controlling the DC voltage of the DC voltage control end of the DC pole as the upper limit of the output of the DC current controller of the voltage source converter.

The method for obtaining the DC current reference value of the DC voltage control end of the DC pole by the acquisition unit comprising: subtracting a current deviation from the DC current reference value of the DC current control end of the DC pole as the DC current reference value of the DC voltage control end.

In the DC voltage reference value calculation unit, when the DC voltage control end of the DC pole contains two or more voltage source converters operating in series, one of the voltage source converters is selected as the master control converter, and the other converters are the slave control converters, the DC voltage reference values of each slave control converter are synchronously consistent with the DC voltage reference value of the master control converter.

In the DC voltage reference value calculation unit, when the DC voltage control end of the DC pole contains two or more voltage source converters operating in series, if the DC voltage control end of the DC pole substantially controls DC voltage, the DC voltage reference value $U_{dcref}$ required for controlling the DC voltage is distributed according to the total number n of voltage source converters in series operation and used as the DC voltage reference value $U_{dVref}$ of each voltage source converter in operation, where $$U_{dVref} = \frac{U_{dcref}}{N},$$

N is a positive integer.

The above embodiments are only for explaining the technical idea of the present invention, and the scope of protection of the present invention is not limited thereto. Any modification made based on the technical idea according to the technical idea of the present invention falls within the protection scope of the present invention.

What is claimed is:

1. A voltage and current control method for DC transmission system, the DC transmission system comprising at least one DC pole, the DC pole having a DC current control end and a DC voltage control end, and the DC voltage control end of the DC pole comprising at least one voltage source converter, characterized in that the control method comprising:

obtaining a DC voltage reference value $U_{dcref}$ required for controlling a DC voltage of the DC voltage control end according to a DC voltage control target of the DC pole, and obtaining a DC voltage measurement value $U_{dV}$ of the voltage source converter of the DC voltage control end;

obtaining a DC current reference value $I_{dcref}$ of the DC voltage control end of the DC pole and a DC current measurement value $I_{dc}$ of the DC voltage control end of the DC pole;

using the DC voltage reference value $U_{dcref}$ required for controlling the DC voltage as the DC voltage reference value $U_{dVref}$ of the voltage source converter if the DC voltage control end of the DC pole substantially controls the DC voltage;

calculating a difference between the DC current measurement value $I_{dc}$ and the DC current reference value $I_{dcref}$ if the DC voltage control end of the DC pole substantially controls a DC current, and then inputting the difference into a DC current controller of the voltage source converter to perform closed-loop control, and using the output of the DC current controller as the DC voltage reference value $U_{dVref}$ of the voltage source converter;

using ½ of the DC voltage reference value $U_{dVref}$ of the voltage source converter as a DC bias of a bridge arm voltage of the voltage source converter, and calculating a difference between the DC voltage reference value $U_{dVref}$ of the voltage source converter and the DC voltage measurement value $U_{dv}$, then inputting the difference into the DC voltage control outer loop of the voltage source converter to perform closed-loop control and realize the control of DC voltage or DC current of the DC pole.

2. The voltage and current control method for DC transmission system according to claim 1, characterized in that: using the DC voltage reference value $U_{dcref}$ required for controlling the DC voltage of the DC voltage control end of the DC pole as an upper limit of the output of the DC current controller of the voltage source converter.

3. The voltage and current control method for DC transmission system according to claim 1, characterized in that: the method for obtaining the DC current reference value $I_{dcref}$ of the DC voltage control end of the DC pole comprising: subtracting a current deviation from a DC current reference value of the DC current control end of the DC pole as the DC current reference value $I_{dcref}$ of the DC voltage control end of the DC pole.

4. The voltage and current control method for DC transmission system according to claim 1, characterized in that: when the DC voltage control end of the DC pole contains two or more voltage source converters operating in series, one of the voltage source converters is selected as a master control converter, and the other converters are slave control converters, the DC voltage reference values of each slave control converter are synchronously consistent with the DC voltage reference value of the master control converter.

5. The voltage and current control method for DC transmission system according to claim 1, characterized in that: when the DC voltage control end of the DC pole contains two or more voltage source converters operating in series, if the DC voltage control end of the DC pole substantially controls DC voltage, the DC voltage reference value $U_{dcref}$ required for controlling the DC voltage is distributed according to the total number n of voltage source converters in series operation and used as the DC voltage reference value $U_{dVref}$ of each voltage source converter in operation, where $$U_{dVref} = \frac{U_{dcref}}{N},$$

N is a positive integer.

6. A voltage and current control device for DC transmission system, the DC transmission system comprising at least one DC pole, the DC pole comprising a DC current control end and a DC voltage control end, the DC voltage control end of the DC pole comprising at least one voltage source converter, characterized in that: the control device comprising an acquisition unit, a DC voltage reference value calculation unit and a DC voltage control unit, wherein:

the acquisition unit configured for obtaining a DC voltage reference value $U_{dcref}$ required for controlling a DC voltage of the DC voltage control end of the DC pole according to a DC voltage control target of the DC pole, a DC voltage measurement value $U_{dv}$ of the voltage source converter of the DC voltage control end, a DC current reference value $I_{dcref}$ of the DC voltage control end of the DC pole and a DC current measurement value $I_{dc}$ of the DC voltage control end of the DC pole;

the DC voltage reference value calculation unit configured for calculating the DC voltage reference value $U_{dVref}$ of the voltage source converter at the DC voltage control end of the DC pole; if the DC voltage control end of the DC pole substantially controls the DC voltage, using the DC voltage reference value $U_{dcref}$ required for controlling the DC voltage as the DC voltage reference value $U_{dVref}$ of the voltage source converter; if the DC voltage control end of the DC pole substantially controls a DC current, calculating a difference between the DC current measurement value $I_{dc}$ with the DC current reference value $I_{dcref}$, and then inputting the difference into a DC current controller of the voltage source converter to perform closed-loop control, and using the output of the DC current controller as the DC voltage reference value $U_{dVref}$ of the voltage source converter;

the DC voltage control unit configured for using ½ of the DC voltage reference value $U_{dVref}$ of the voltage source converter as a DC bias of a bridge arm voltage of the voltage source converter, and calculating a difference between the DC voltage reference value $U_{dVref}$ of the voltage source converter with the DC voltage measurement value $U_{dV}$, then inputting the difference into the DC voltage control outer loop of the voltage source converter to perform closed-loop control and realize the control of DC voltage or DC current of the DC pole.

7. The voltage and current control device for DC transmission system according to claim 6, characterized in that: the DC voltage reference value calculation unit further comprises an upper limit setting subunit of the DC current controller configured for using the DC voltage reference value $U_{dcref}$ required for controlling the DC voltage of the DC voltage control end of the DC pole as an upper limit of the output of the DC current controller of the voltage source converter.

8. The voltage and current control device for DC transmission system according to claim 6, characterized in that: the method for obtaining the DC current reference value $I_{dcref}$ of the DC voltage control end of the DC pole by the acquisition unit comprising: subtracting a current deviation from a DC current reference value of the DC current control end of the DC pole as the DC current reference value $I_{dcref}$ of the DC voltage control end of the DC pole.

9. The voltage and current control device for DC transmission system according to claim 6, characterized in that: in the DC voltage reference value calculation unit, when the DC voltage control end of the DC pole contains two or more voltage source converters operating in series, one of the voltage source converters is selected as a master control converter, and the other converters are slave control converters, the DC voltage reference values of each slave control converter are synchronously consistent with the DC voltage reference value of the master control converter.

10. The voltage and current control device for DC transmission system according to claim 6, characterized in that: in the DC voltage reference value calculation unit, when the DC voltage control end of the DC pole contains two or more voltage source converters operating in series, if the DC voltage control end of the DC pole substantially controls DC voltage, the DC voltage reference value $U_{dcref}$ required for controlling the DC voltage is distributed according to the total number n of voltage source converters in series operation and used as the DC voltage reference value $U_{dVref}$ of each voltage source converter in operation, where $$U_{dVref} = \frac{U_{dcref}}{N},$$

N is a positive integer.

* * * * *